(12) United States Patent
Bender

(10) Patent No.: US 6,308,582 B1
(45) Date of Patent: Oct. 30, 2001

(54) MEASURING DEVICE FOR MEASURING THE FLOW RATE AND TEMPERATURE OF A FLOWABLE MEDIUM

(75) Inventor: Helmuth Bender, Eschenburg-Wissenbach (DE)

(73) Assignee: Reich KG Regel-und Sicherheitstechnik, Eschenburg-Wissenbach (DE)

( * ) Notice: Subject to any disclaimer, the term of this patent is extended or adjusted under 35 U.S.C. 154(b) by 0 days.

(21) Appl. No.: 09/299,488

(22) Filed: Apr. 26, 1999

(30) Foreign Application Priority Data

Mar. 26, 1999 (DE) .......................................... 299 05 655 U

(51) Int. Cl.[7] .............................. G01F 1/22; G01F 23/30
(52) U.S. Cl. ............................ 73/861.57; 73/305; 73/323
(58) Field of Search .......................... 73/861.76, 861.56, 73/861.57, 861.93, 861.88, 239, 3.5, 323

(56) References Cited

U.S. PATENT DOCUMENTS

| | | | | |
|---|---|---|---|---|
| 2,457,297 | * | 12/1948 | Aller | 73/861.57 |
| 2,805,573 | * | 9/1957 | Emmons | 73/861.57 |
| 2,858,697 | * | 11/1958 | Entwistle | 73/861.57 |
| 3,931,737 | * | 1/1976 | Conkling et al. | 73/861.56 |
| 4,424,716 | * | 1/1984 | Boehringer et al. | 73/861.56 |
| 4,567,777 | * | 2/1986 | Kobold | 73/861.56 |
| 4,699,617 | * | 10/1987 | Moriuchi et al. | 73/861.57 |
| 5,507,190 | * | 4/1996 | Guttmann | 73/861.57 |

FOREIGN PATENT DOCUMENTS

| | | |
|---|---|---|
| 34 28 913 A1 | 10/1985 | (DE) . |
| 85 08 222.8 | 11/1985 | (DE) . |
| 35 08 570 C2 | 6/1987 | (DE) . |
| 38 23 449 A1 | 1/1990 | (DE) . |
| 35 46 354 C2 | 10/1993 | (DE) . |
| 35 09 718 C2 | 3/1994 | (DE) . |
| 42 42 342 C2 | 6/1994 | (DE) . |
| 44 20 246 C1 | 10/1995 | (DE) . |
| 4445 005 C1 | 5/1996 | (DE) . |
| 01 88 131 A1 | 7/1986 | (EP) . |
| 21 82 429 A | 5/1987 | (GB) . |
| WO 97 01 723 A1 | 1/1997 | (WO) . |

* cited by examiner

Primary Examiner—Harshad Patel
(74) Attorney, Agent, or Firm—Weingarten, Schurgin, Gagnebin & Hayes LLP

(57) ABSTRACT

The present invention relates to a measuring device for measuring flux rate and temperature of a flowable medium, comprising an external pipe sleeve and an internal pipe provided within said external pipe sleeve, with the diameter of said internal pipe having been dimensioned such that a cavity is formed between said internal pipe and said external pipe sleeve, wherein medium is allowed to flow into said internal pipe via an aperture formed at a first end of said internal pipe, and an aperture is provided at the second end of said internal pipe via which the medium can flow out of the internal pipe and exit the measuring device via said cavity. A flux meter and a temperature meter are provided within or along this flow path formed in the measuring device.

16 Claims, 3 Drawing Sheets

MEASURING DEVICE FOR MEASURING THE FLOW RATE AND TEMPERATURE OF A FLOWABLE MEDIUM

The present invention relates to a measuring device for measuring the flow rate and the temperature of a flowable medium, as well as to means for providing one or plural branch pipings in a pipe containing such medium and including such a measuring device.

Disclosed in German utility model serial no. G 85 08 222 is a flowmeter for adjusting a heat flow which allows the measurement of f low rate and temperature of the flowable medium flowing therethrough. For measuring the temperature and the flow rate of a predetermined pipeline, said pipeline is cut open and this flowmeter is installed in the course of the pipeline. With heating circuit distributors, the problem often arises that what is to be measured is the temperature and the flow rate of the medium in a return branch, with such measurement often being conducted at a central site for several parallel heating circuits. In this case, plural branch pipings terminate in a main pipe, with a flowmeter of the aforementioned kind being installed in the course of the respective branch pipings shortly before the confluence in order to allow a central reading of flow rate and temperature of plural branches at this one central site. What is diadvantageous about this prior art flowmeter is that for each branch, a flowmeter has to be provided in the branch and a reflux connection has to be provided in the main pipeline. This is labor-intensive on the one hand, and on the other hand undesired in view of the little space usually available.

It is therefore the object of the present invention to provide a measuring device for measuring the flow rate and the temperature of a flowable medium which overcomes these disadvantages.

This object is accomplished by a measuring device for measuring the flow rate and temperature of a flowable medium with an external pipe sleeve and an internal pipe contained within said external pipe sleeve, the diameter of said internal pipe having been selected such that a cavity forms between said internal pipe and said external pipe sleeve, with medium being allowed to flow into said internal pipe via an aperture provided at a first end of said internal pipe and an aperture being provided at the second end of the internal pipe via which said medium can exit said internal pipe and leave the measuring device via the cavity, with a flowmeter and a temperature meter being mounted in or along this flow path formed in the measuring device for the flowable medium.

Such a measuring device allows the measurement of flow rate and temperature when the internal pipe is connected to a branch, at the same time making it possible to return the medium made to flow through the measuring device into the main pipe. The measuring device of the present invention has the advantage that only two apertures need to be provided in a main pipe, the one aperture serving for introducing flowable medium from a branch into the measuring device, with the other aperture housing the measuring device through which the flowable medium from the branch flows and which returns said medium into the main pipe. As a consequence, with only a minimum space requirement, plural branches may be provided one next to the other at a main pipe, with the respective inventive measuring device indicating the temperature and the flow rate of the flowable medium returned into the main pipe from the branch.

Likewise, it is certainly possible to use the measuring device of the invention not as a reflux meter but for measuring the temperature and flow rate of a branch in which medium from the main pipe flows into the branch. Usually, however, what interests are the different flow rates and temperatures of the returned medium streams flowing in the branches since they differ from each other.

It is another object of the present invention to provide means for forming one or plural branches in a medium-containing pipe including a measuring device according to the present invention.

This object is accomplished according to the invention by a two-part unit mountable on said pipe comprising a lower part and an upper part, with two opposing apertures being formed in the pipe for each branch transversely to the pipe axis, said lower part including a through passage sealingly fitting on the lower aperture for the flowable medium, and said upper part including an insert fitting into the upper aperture, both parts being capable of being firmly connected to the pipe, with the measuring device of the invention being provided in the upper part.

A particularly advantageous embodiment of the measuring device has the flowmeter provided within the internal pipe and the temperature meter within the cavity. The flowmeter preferably comprises a floating body movably mounted within said internal tube. Said floating body may contact a pressure spring exerting a spring power against the direction of flow of said medium.

In an advantageous manner, for indicating the flux rate measured, said floating body is connected to a pointer of an indicating device. Alternatively, the flux rate, in particular if part of the internal pipe and the external pipe sleeve is transparent, may be indicated by the floating body itself.

The temperature meter includes a thermometer, in particular comprising a thermometer tube and corresponding supporting and fixing means for mounting said thermometer in the cavity. In connection with said thermometer, said indicating device may include a memory pointer for marking the temperature value determined by the temperature meter.

In a particularly preferred embodiment, adjusting means movable relative to the internal pipe, preferably a spindle, is provided, with the position of the adjustment means relative to the internal pipe serving to adjust the flux rate through the measuring device. This measure will make it possible to simultaneously adjust the flux rate of the branch piping, besides the measurement of temperature and flux rate as well as the possibility of using this device in a simple manner for providing a branching.

The adjustment means may be connected to a turning handle, which—when actuated—will allow a variation of the position of the adjustment means relative to the internal pipe and thus of the flux rate through the branch piping.

In order to facilitate mounting it on a branch piping, the internal pipe protrudes somewhat from the external pipe sleeve.

In a particularly preferred embodiment of the device for forming one or plural branchings of a medium-containing pipe with a measuring device of the present invention, the lower part and the upper part are interconnected by means of a hinged joint. As an alternative thereto, or in combination with this embodiment, the lower part may be sealingly joined with the first end of the internal pipe. The connection to the branch piping is obtained in each case by the connection to the internal pipe, while the external pipe sleeve serves to return the flowable medium into the main pipeline via the cavity.

Further advantageous embodiments of the invention are defined in the subclaims.

In the following, embodiments are described in more detail with reference to the drawings, in which.

Figure 1:
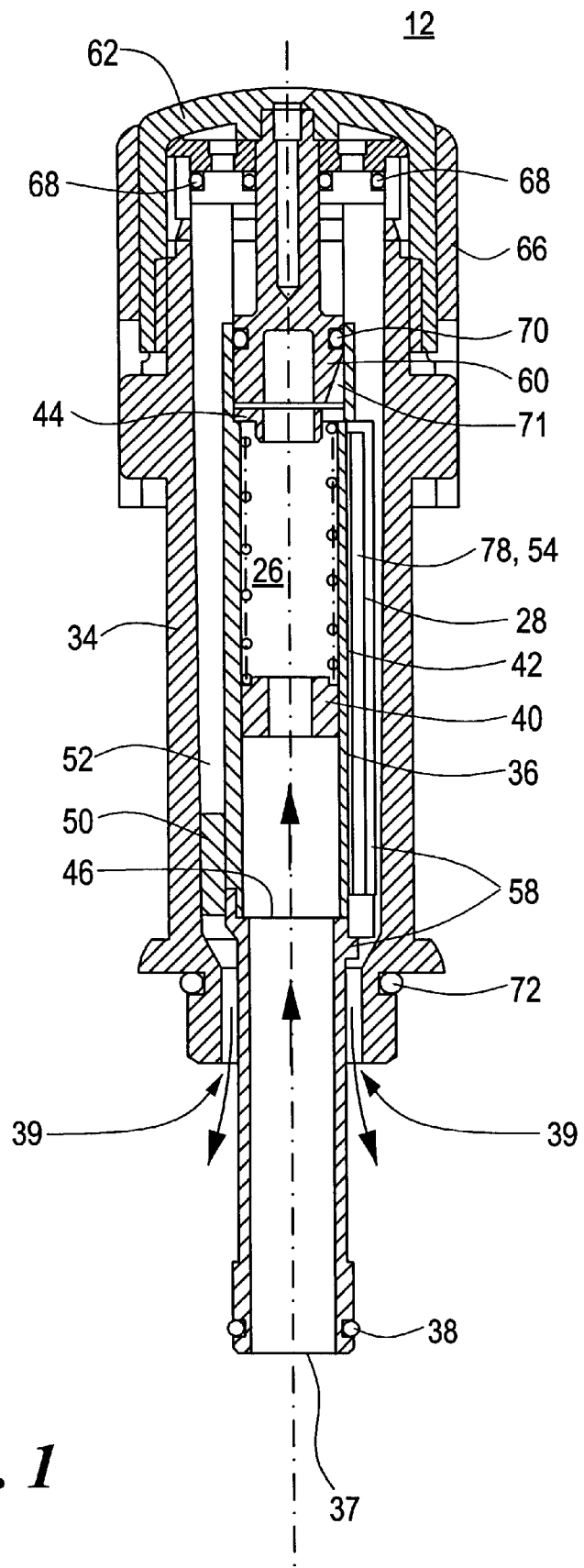
FIG. 1 shows a schematical sectional view of a measuring device according to the invention.

FIG. 1 shows a measuring device 12 according to the invention with a fluxmeter 26 for measuring the flux rate and a temperature meter 28 for measuring the temperature of a flowable medium. Said measuring device 12 comprises an external pipe sleeve 34 and an internal pipe 36 accommodated within said pipe sleeve 34. The diameter of said internal pipe 36 has been selected such that a cavity 52 is formed between the external surface of the internal pipe 36 and the internal surface of said pipe sleeve 34, through which said flowable medium entering said measuring device 12 via the first end 37 will flow before exiting said measuring device 12 again at 39. The bottom side of said internal pipe 36 exhibits a seal or gasket 38 whose function is described with reference to FIGS. 2 and 3. The fluxmeter 26 is mounted within said internal pipe 36 and the temperature meter is mounted within said cavity 52. To be more precise, the fluxmeter 26 includes a floating body 40 movably mounted within said internal pipe 36 which is contacted by a pressure spring 42, said pressure spring 42 contacting a spring stop 44 within said internal pipe 36 at the end opposing said floating body 40. In this arrangement, said pressure spring 42 exerts a spring power which is against the flow direction of the medium, cf. the arrows within the internal pipe 36. If the internal pipe 36 and parts of the external pipe sleeve 34 are of transparent design, the position of the floating body 40 itself may be the indication for the current flux rate.

The temperature meter 28 comprises a thermometer 78 with a thermometer tube 54 and corresponding support and fixing means 58 for mounting said thermometer 78 within said cavity 52. If the external pipe sleeve 34 is of transparent design, the thermometer may easily be read from outside the measuring device 12.

On the upper side of the measuring device 12, a turning handle 62 is provided which is connected to an adjustment spindle 60 protruding into said internal pipe 36. FIG. 1 shows the adjustment spindle 60 in a position in which it seals off the internal pipe 36, cooperating for this purpose with sealing ring 70. In this position, no medium introduced via the first side 37 of the internal pipe 36 may pass the measuring device 12, i.e. no medium will exit from aperture 39. If the turning handle 62 is turned, the spindle 60 will move upward together with the turning handle, resulting in the sealing ring 70 losing contact to the internal surface of the internal pipe 36, the bevelled part 71 of the spindle 60 reaching into the area of the upper aperture of the internal pipe 36, thus enabling medium entering via the first side 37 of said internal pipe 36 to flow between the bevelled portion 71 of the spindle 60 and the interior side of the internal pipe 36 and to the cavity 52 of the measuring device 12. In this case, medium will exit from the aperture 39 of the measuring device 12. Provided above said turning handle 62 is a safety cap 66 partially overlapping said turning handle 62 which is to prevent accidental damage to the turning handle 62. The cavity 52 may contain plural spacers 50 for safeguarding the distance between the surface of the internal pipe 36 and the interior surface of the pipe sleeve 34. A bearing edge 46 serves to prevent the floating body 40 from accidentally falling out of said measuring device 12 in transport of said measuring device 12. Sealing rings 68 serve to seal off the through passage for the medium formed in the measuring device 12 at the area of the adjustment spindle 60 and the turning handle 62.

Figure 2:
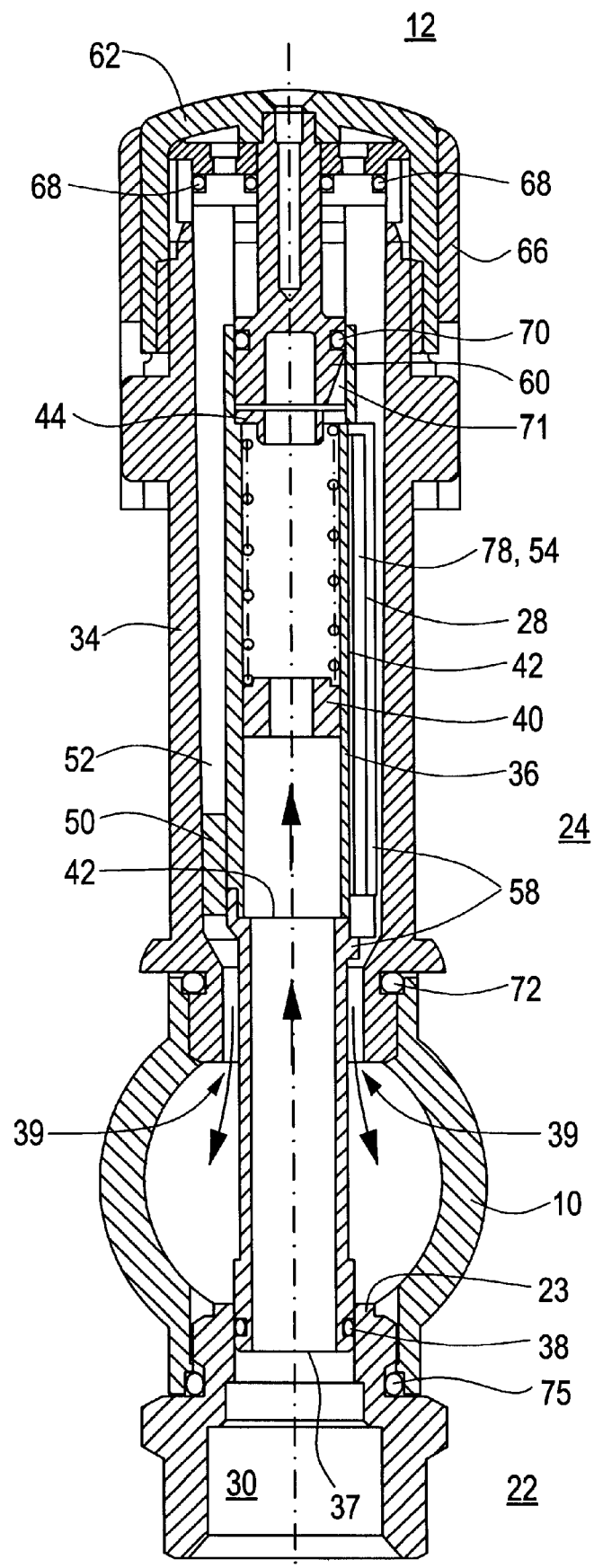
FIG. 2 shows a schematical sectional view of a first embodiment of a device using the measuring device according to the invention for forming a branch piping in a medium-containing pipeline.

FIG. 2 shows a device for forming one or plural branch pipings in a medium-containing distributing pipe 10 having an upper part 24 as well as a lower part 22. In FIG. 2, reference numerals identical to those of FIG. 1 refer to identical components for which reason they are not described again here. The upper part 24 comprises a measuring device 12 according to the invention, while the lower part 22 is formed by a pipe joint. Said pipe joint 22 includes a through passage 30 for a branch piping. For assembling this combination, the measuring device 12 is first of all mounted in an aperture 16 of the distributing pipe 10 provided for this purpose, for example by screwing, subsequently the pipe joint is mounted at the opposing side of the distributing pipe 10, in an aperture 18 provided there, where it is preferably also attached by means of screws. In cooperation with the seal 38, a sealing connection of the internal pipe 36 of the measuring device 12 and the interior side 23 of the pipe joint is obtained in this case. The pipe joint 22 serves for the connection of a branch piping. In operation, medium flowing into the measuring device 12 from the branch piping via said pipe joint 22 will first of all pass the distributing pipe 10 sealed tight inside said internal pipe 36, and, depending on the position of the adjustment spindle 60, more or less made to flow into the interior of the distributing pipe 10 via the cavity 52. A seal or gasket 75 ensures a tight connection between the pipe joint 22 and the distributing pipe 10. Similarly, a seal or gasket 72 is provided for sealing the upper part 24 from the distributing pipe 10.

Figure 3:
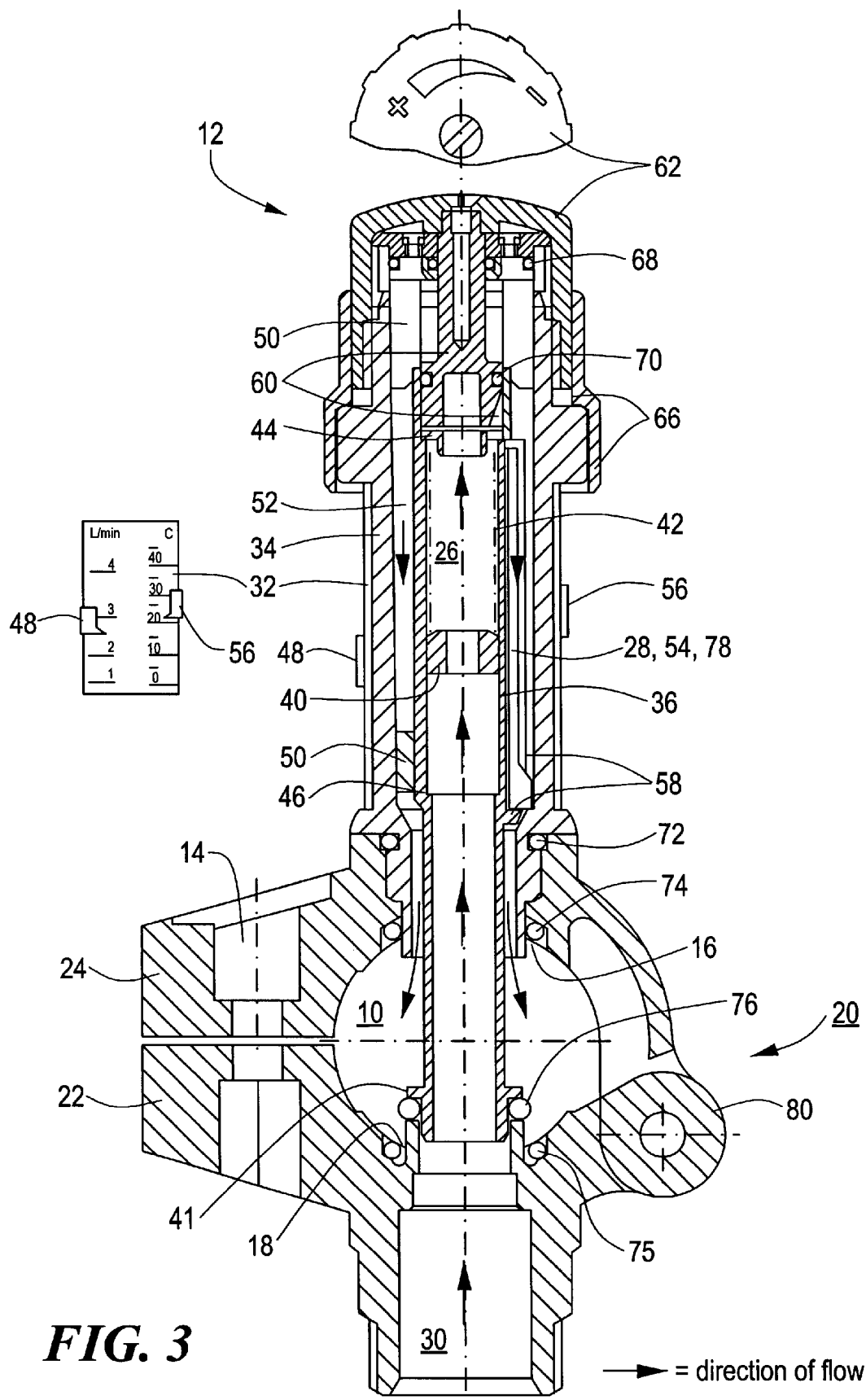
FIG. 3 shows a schematical sectional view of a second embodiment of a device using the measuring device according to the invention for forming a branch piping in a medium-containing pipe.

FIG. 3 shows a further embodiment of a device for providing one or plural branch pipings in a medium-containing pipe using a measuring device according to the invention. In FIG. 3, same reference numerals refer to same components as those in FIGS. 1 and 2, and thus are not explained again here. The embodiment shown in FIG. 3 has the upper part 24 and the lower part 22 interconnected via a hinged joint 80 in such a manner that they form a unit 20 which may be swung open. At the end of the unit 20 opposite said hinged joint 80, attachment means 14 are provided for detachably connecting said upper and lower parts 22, 24. This embodiment ensures a tight passage from the through passage 30 of the lower part 22 to the internal pipe 36 by the cooperation of a sealing ring 76 with a shoulder 41 of the internal pipe 36. For providing a branch piping, merely two apertures 16, 18 need to be provided in a medium-containing pipe, one of which will first of all receive the measuring device 12 connected to the upper part 24 and then the lower part 22 will be connected to the upper part.

FIG. 3 furthermore shows an alternative embodiment for the indication of flux rate and temperature of the flowable medium contained in the measuring device 12. This embodiment may also be used with the embodiments of the measuring device 12 as shown in FIGS. 1 and 2. In this case, the floating body 40 is connected to a pointer 48 of an indication device 32, thus indicating the current flux rate in this way. The indication device 32 includes a memory pointer 56 for marking the temperature value as determined by the temperature meter 28. Seals 72 and 74 serve to seal off said upper part 24.

The measuring device 12 as well as the device for providing branch pipings using a measuring device 12 is usually made of metal or a metal alloy. However, it is also possible to use all other kinds of suitable materials such as plastic, glass or the like for producing the individual elements. As already set out above, especially the internal pipe 36 and the external pipe sleeve 34 may be made partially or entirely from transparent material, for example from plexiglass.

What is claimed is:

1. A measuring device for measuring the flux rate and temperature of a flowable medium, comprising:

an external pipe sleeve and an internal pipe provided within said external pipe sleeve, with the diameter of said internal pipe having been selected such that a cavity is formed between said internal pipe and said external pipe sleeve, wherein medium is allowed to flow into said internal pipe via an aperture formed at a first end of said internal pipe, and an aperture is provided at the second end of said internal pipe via which said medium flows out of said internal pipe and exits the measuring device via said cavity, wherein a flowmeter is mounted within the internal pipe and a temperature meter are mounted within said cavity for the flowable medium.

2. The measuring device as claimed in claim 1 wherein said flowmeter comprises a floating body movably mounted within said internal pipe.

3. The measuring device as claimed in claim 2 wherein said floating body contacts a pressure spring which exerts a spring power against the direction of flow of said medium.

4. The measuring device as claimed in claim 2 wherein said floating body is connected to a pointer of an indicating device for indicating the flux rate measured, or indicates the flux rate by itself, and wherein the internal pipe and the external pipe sleeve are of at least partially transparent design.

5. A device for providing one or plural branch pipings in a medium-containing pipe with a measuring device as in claim 4, consisting of a two-part unit which can be mounted onto said pipe, comprising a lower part and an upper part, wherein for each branch piping transversely to the pipe, two opposing apertures are formed in said pipe, and said lower part includes a through passage sealingly fitting onto the lower aperture, and said upper part includes an insert fitting into the upper aperture, and both parts can be firmly joined to said pipe, with the measuring device being provided in said upper part.

6. The measuring device as claimed claim 1 wherein the temperature meter comprises a thermometer as well as corresponding support and fixing means for mounting said thermometer within said cavity.

7. The measuring device as claimed in claim 6 wherein the indicating device includes a memory pointer for marking the temperature value determined by the temperature meter.

8. A device for providing one or plural branch pipings in a medium-containing pipe with a measuring device as in claim 7, consisting of a two-part unit which can be mounted onto said pipe, comprising a lower part and an upper part, wherein for each branch piping transversely to the pipe, two opposing apertures are formed in said pipe, and said lower part includes a through passage sealingly fitting onto the lower aperture, and said upper part includes an insert fitting into the upper aperture, and both parts can be firmly joined to said pipe, with the measuring device being provided in said upper part.

9. The measuring device as claimed in claim 1 further comprising an adjustment device movable relative to the internal pipe, with the flux rate through the measuring device being adjustable by the position of the adjustment device relative to the internal pipe.

10. The measuring device as claimed in claim 9 wherein the adjustment device is connected to a turning handle which, when actuated, allows the position of the adjustment device relative to the internal pipe to be varied.

11. A device for providing one or plural branch pipings in a medium-containing pipe with a measuring device as in claim 10, consisting of a two-part unit which can be mounted onto said pipe, comprising a lower part and an upper part, wherein for each branch piping transversely to the pipe, two opposing apertures are formed in said pipe, and said lower part includes a through passage sealingly fitting onto the lower aperture, and said upper part includes an insert fitting into the upper aperture, and both parts can be firmly joined to said pipe, with the measuring device being provided in said upper part.

12. The measuring device as claimed in claim 1 wherein the internal pipe protrudes from the external pipe sleeve.

13. A device for providing one or plural branch pipings in a medium-containing pipe the measuring device as in claim 1, consisting of a two-part unit which is mounted onto said pipe, comprising a lower part and an upper part, wherein for each branch piping transversely to the pipe, two opposing apertures are formed in said pipe, and said lower part includes a through passage sealingly fitting onto the lower aperture, and said upper part includes an insert fitting into the upper aperture, and both parts can be firmly joined to said pipe, with the measuring device being provided in said upper part.

14. The device as claimed in claim 13 wherein the lower part and the upper part are inter-connected by means of a hinged joint.

15. The device as claimed in claim 13 wherein the lower part may be sealingly joined with the first end of said internal pipe.

16. The device as claimed in claim 13 wherein the flowable medium entering the measuring device via the through passage is discharged into the medium-containing pipe via the measuring device, said measuring device thus acting as a reflux meter.

\* \* \* \* \*

UNITED STATES PATENT AND TRADEMARK OFFICE
CERTIFICATE OF CORRECTION

PATENT NO.    : 6,308,582 B1
DATED         : October 30, 2001
INVENTOR(S)   : Helmuth Bender It is certified that error appears in the above-identified patent and that said Letters Patent is hereby corrected as shown below:

<u>Title page,</u>
Item [30], Foreign Application Priority Data, "299 05 655 U" should read
-- 299 05 655.4 --;

<u>Column 1,</u>
Line 12, "of f low" should read -- of flow --;

<u>Column 5,</u>
Line 21, "are mounted" should read -- is mounted --; and

<u>Column 6,</u>
Line 33, delete "a medium-containing pipe".

Signed and Sealed this

Seventeenth Day of September, 2002

*Attest:*

*Attesting Officer*

JAMES E. ROGAN
*Director of the United States Patent and Trademark Office*